US010990779B1

(12) United States Patent
Johanson

(10) Patent No.: US 10,990,779 B1
(45) Date of Patent: Apr. 27, 2021

(54) SECURING AND AUTHENTICATING AN ITEM BASED ON 2-D BARCODE ENCODING

(71) Applicant: Eric Johanson, Sandown, NH (US)

(72) Inventor: Eric Johanson, Sandown, NH (US)

( * ) Notice: Subject to any disclaimer, the term of this patent is extended or adjusted under 35 U.S.C. 154(b) by 0 days.

(21) Appl. No.: 16/847,159

(22) Filed: Apr. 13, 2020

Related U.S. Application Data

(60) Provisional application No. 62/861,632, filed on Jun. 14, 2019.

(51) Int. Cl.
*G06K 7/14* (2006.01)
*G06K 19/06* (2006.01)

(52) U.S. Cl.
CPC ......... *G06K 7/1473* (2013.01); *G06K 7/1417* (2013.01); *G06K 19/06037* (2013.01)

(58) Field of Classification Search
CPC .......... G06K 7/1473; G06K 19/06037; G06K 7/1417
See application file for complete search history.

(56) References Cited

U.S. PATENT DOCUMENTS

2016/0267370 A1* 9/2016 Nishizaki ......... G06K 19/06037
2020/0076604 A1* 3/2020 Argones Rua .......... G06F 21/32

* cited by examiner

*Primary Examiner* — Matthew Mikels
(74) *Attorney, Agent, or Firm* — Luis Figarella

(57) ABSTRACT

A system and method are disclosed for creating 2D barcodes that are watermarked in a digital fashion. The system and method include changing specific elements within the code words as well as modifying the physical representation within elements of the codewords.

10 Claims, 4 Drawing Sheets

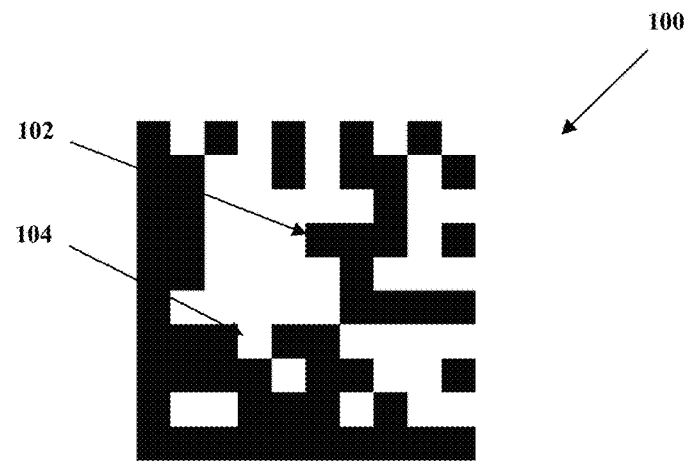
Figure 1
Prior Art
Figure 2
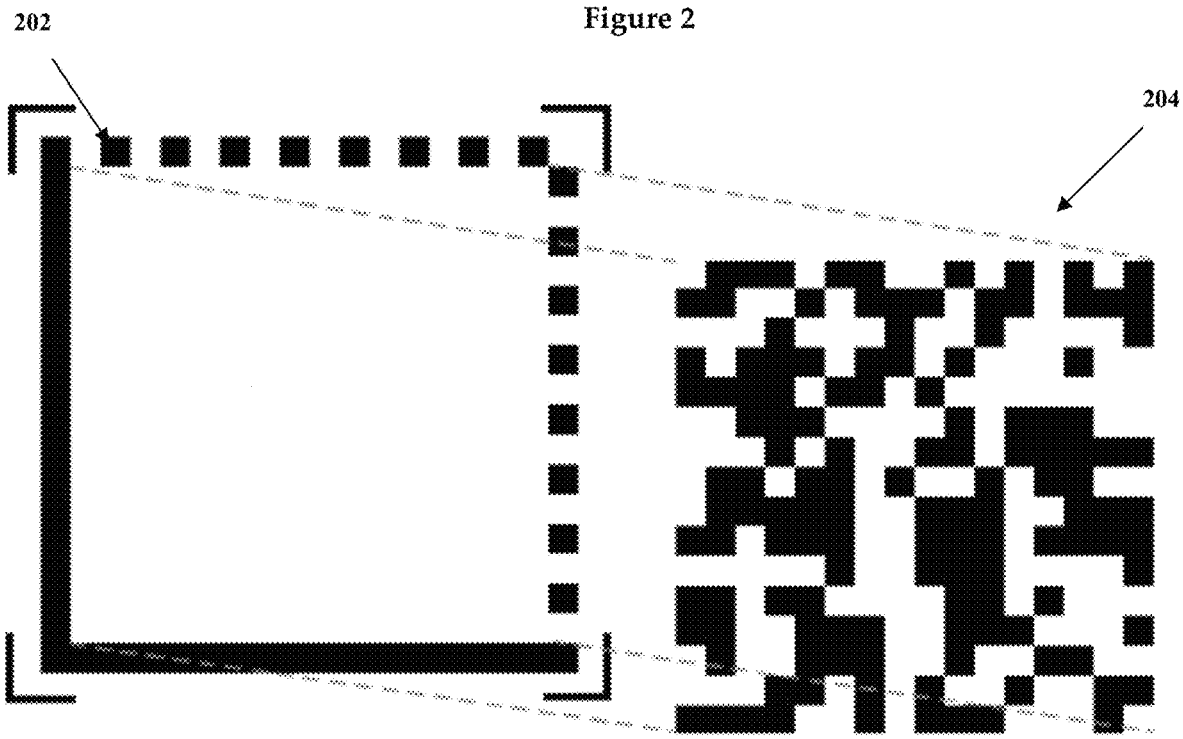

SECURING AND AUTHENTICATING AN ITEM BASED ON 2-D BARCODE ENCODING

CROSS-REFERENCE TO RELATED APPLICATIONS

This application claims priority to U.S. Provisional patent application Ser. No. 61/861,632 titled "Securing and Authenticating an item based on 2-D barcode encoding", filed on Jun. 14, 2019 the disclosure of which is herein incorporated by reference in its entirety.

PATENTS CITED

The following documents and references are incorporated by reference in their entirety, Pic (U.S. Pat. No. 9,934,457), Costa et al (U.S. Pat. No. 7,852,195) and Guigan (U.S. Pat. Pub. No. 2014/0224879).

FIELD OF THE INVENTION

The present invention relates to a system and method for securing and authenticating an item via the modification of 2-D barcodes.

DESCRIPTION OF THE RELATED ART

There is a need to authenticate against two types of counterfeits. The first, is the outright copy of an item, where everything, including the product label, is copied identically (think running a copy machine). Solutions such as those implemented by Vi3Global allow for the 'flagging' of 'repeated' numbers in Unique ID product tags, easily identifying and removing them.

But counterfeiters are more creative than simple copy machines. In many cases, the counterfeit is created with 2D codes using novel (but valid) parameters within the Unique ID scheme. In short, the counterfeiters have figured out how to generate new labels that appear to be valid, in fact using similar technology to that used to create valid labels.

What is needed, is a system and a method to generate 2-D codes that differ slightly from accepted standards, where such differences are used as a means of verifying authenticity. It is important that the 2-D codes can still be read by all existing standard scanning systems, and that the differences can be automatically optically verified as an authenticity check.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention is about a method for creating unique and slightly non-standard 2D symbols. The method of which starts with a standard 2D symbol, which was created using standard published algorithms to compute data codewords and error correction codewords, but where the present invention modifies one or more bits of one or more codewords that will be used to generate a novel and slightly non-standard 2D symbol. The present invention is careful to modify the codeword bits in such a way that all existing standard 2D scanners can still read the resulting modified 2D symbols. The method to compute the codeword modifications is to start with the set of data that was used to create the original standard 2D symbol, and transforms that input data into a selection of a set of codeword bits to modify, such that the resulting modification will produce a 2D symbol that is still readable by all existing standard 2D scanners, but which is measurably different from a standard 2D symbol. Said transformation involves the use of a secret, so as to prevent anyone in the public from computing the identical transformation for an arbitrary 2D barcode.

In yet another aspect, said data string transformation is based on a hash of the original data string in which the hash is first salted with a secret salt to prevent counterfeiters or others in the public from accurately computing which codeword bits to modify.

In one aspect the invention is about a computerized system for intentionally creating the aforementioned modified 2D barcodes, said computerized system comprising one or more computing servers for generating the data plus error correction codewords string for a particular 2D symbol, said computer servers modifying one or more bits within one or more said data or error correction codewords using a method so as to generate modified codewords, and said computer servers generating a 2D symbol based on said modified codewords.

In yet another aspect, when a user scans said modified 2D barcode, the computer system receives from said 2D barcode scanner a list of the codeword bits that are in error and compares said bit errors to the expected bit errors for that particular 2D symbol, and if an appropriate number of bit errors match then the computer system declares said 2D barcode authentic.

In one aspect the invention is about a computerized system for intentionally creating uniquely modified 2D barcodes, said computerized system comprising one or more computing servers for generating the data codewords and error correction codewords string for a particular 2D symbol, according to industry-standard 2D barcode generation schemes said computer servers modifying one or more bits within one or more said codewords using the methods described in claims 2 and 3, so as to generate a modified codewords string and said computer servers generating a 2D symbol based on said modified codewords using industry-standard 2D barcode methods. In another aspect scanning said 2D barcode receiving from said 2D barcode decoder a list of the bits and/or codewords in error and comparing said errors to the expected errors based on the codeword modifications described in claims 2 and 3; and if an appropriate number of errors match, then declaring said barcode authentic.

In another aspect, the invention is about the creation of an authenticatable 2D barcode indicia by introducing microfeatures into one or more of its module's cells. In this present invention, a microfeature is the application of either a tiny chamfer or a tiny fillet within said indicia module/cell. In another aspect, said chamfers and fillets appear only in certain modules/cells, and the method to compute which modules/cells contain the microfeatures is to start with the set of data that was used to create the original standard 2D symbol, and transform that input data into a selection of eligible modules/cells that will receive said microfeatures.

In yet another aspect said input data transformation is based on a hash of the original data string in which the hash is first salted with a secret salt to prevent counterfeiters or others in the public from accurately computing which modules/cells eligible for a microfeature will actually have the microfeature.

In another aspect, while scanning said 2D barcode, a digital screen presents a diagram to an authorized user that shows the expected locations for said fillet/chamfer microfeatures for that particular 2D barcode, and an authorized user checks (possibly with the assistance of a loupe) to ensure that the microfeatures shown in said diagram actually exist in the physical barcode, and the microfeatures not shown in said diagram do not actually exist in the physical barcode; and if an appropriate number of microfeatures match, then declaring said barcode authentic.

In one aspect, the invention is about a method for intentionally creating uniquely modified 2D barcodes that differ slightly from standard 2D barcodes, said method comprising starting with a data string to encode, generating the data codewords and error correction codewords for said data string, using industry-standard 2D barcode generation schemes, modifying one or more bits within one or more said codewords so as to generate a set of slightly modified codewords and generating a 2D symbol based on said modified codewords using industry-standard 2D barcode methods. In another aspect, said modifications to codeword bits are based on the original data string, wherein the original data string is computationally transformed into a selection of codeword bits to modify, such that the final 2D symbol constructed from the modified codewords can still be successfully scanned by industry-standard 2D scanners.

In yet another aspect, said data string transformation is based on a hash of the original data string in which the hash is first salted with a secret salt to prevent counterfeiters or others in the public from accurately computing which codeword bits to modify. In another aspect, the method further comprises scanning said 2D barcode, receiving from said 2D barcode decoder a list of the bits and/or codewords in error that result from the codeword as before, and comparing said errors to the expected errors that were computed as before, and if an appropriate number of errors match, then declaring said barcode authentic.

In one aspect the invention is about a computerized system for intentionally creating uniquely modified 2D barcodes, said computerized system comprising one or more computing servers for generating the data codewords and error correction codewords string for a particular 2D symbol, according to industry-standard 2D barcode generation schemes, said computer servers modifying one or more bits within one or more said codewords using the methods described in claims 2 and 3, so as to generate a modified codewords string and said computer servers generating a 2D symbol based on said modified codewords using industry-standard 2D barcode methods.

In one aspect the invention is about a 2D barcode authenticated indicia comprising modifying one or more of its data modules/cells by the addition of a microfeature that is either a chamfer or a fillet within said indicia module/cell. In another aspect the presence and absence of said chamfer/fillet microfeatures is based on the original data string, wherein the original data string is computationally transformed into a sequence of bits that dictate the presence/absence of the microfeature in eligible modules/cells. In yet another aspect, said data string transformation is based on a hash of the original data string in which the hash is first salted with a secret salt to prevent counterfeiters or others in the public from accurately computing which modules/cells eligible for a microfeature will actually have the microfeature. In yet another aspect, scanning said 2D barcode, a digital screen presenting a diagram to an authorized user that shows the expected locations for said fillet/chamfer microfeatures for that particular 2D barcode, an authorized user checking (possibly with the assistance of a loupe) to ensure that the microfeatures shown in said diagram actually exist in the physical barcode, and the microfeatures not shown in said diagram do not actually exist in the physical barcode and if an appropriate number of microfeatures match, then declaring said barcode authentic.

Other features and advantages of the present invention will become apparent upon examining the following detailed description of an embodiment thereof, taken in conjunction with the attached drawings.

BRIEF DESCRIPTION OF THE DRAWINGS

FIG. 1 shows illustrations of a 2-D Data Matrix code, according to the prior art.

FIG. 2 shows illustrations of a 2-D Data Matrix code finder pattern and internal data area, according to the prior art.

Figure 3:
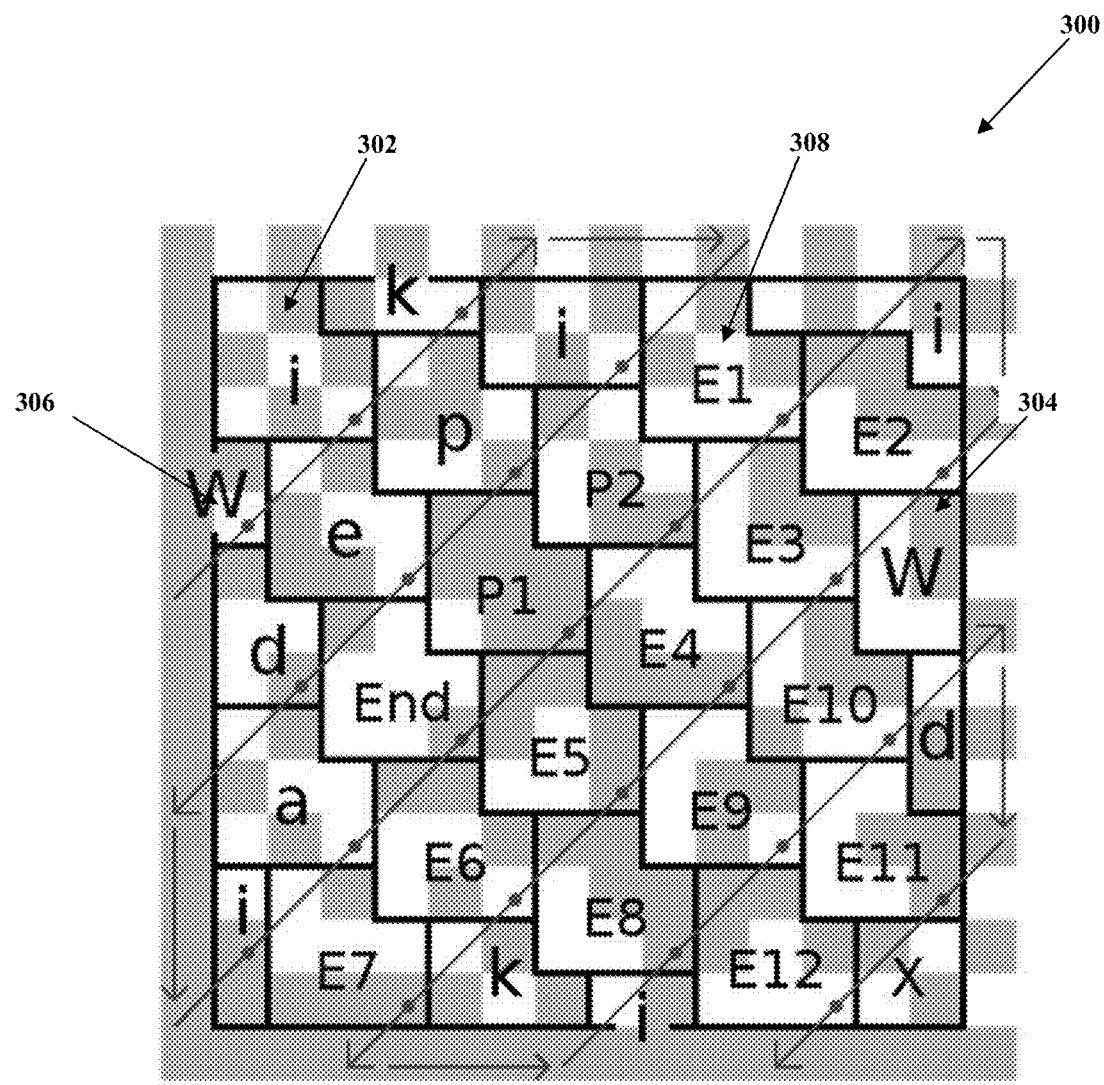
FIG. 3 shows an example of the codewords layout within a 2-D Data Matrix code, according to the prior art.
Figure 4:
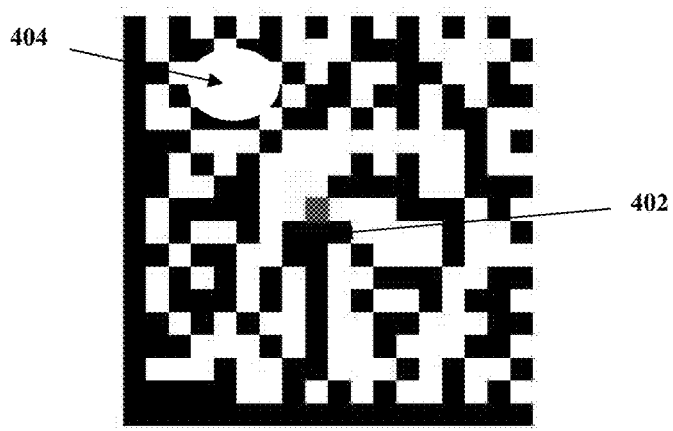
FIG. 4 shows a purposely modified 2-D Data Matrix code, according to an exemplary embodiment of the invention.
Figure 5:
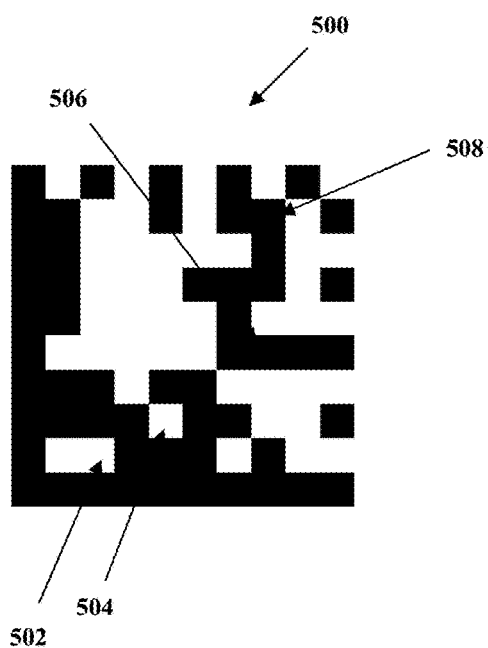
FIGS. 5-6 show examples of codeword modifications in a 2-D Data Matrix code, according to exemplary embodiments of the invention.
Figure 6:
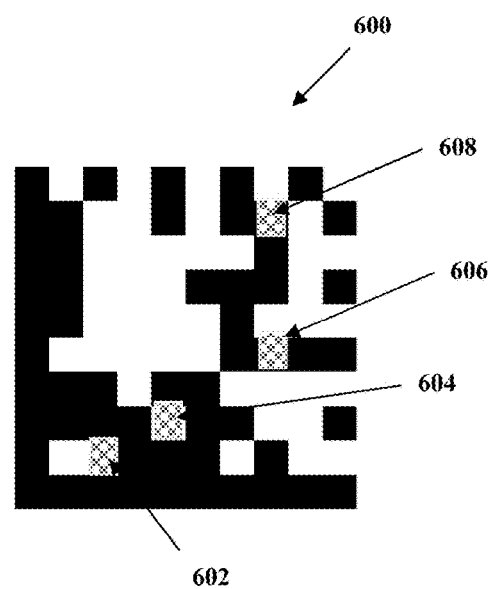

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIGS. 1-2 we see a 2-D Data Matrix barcode 100. Like all matrix codes (QR Code, Aztec Code), it is comprised of an alternating field of black 102 or white 104 marks, whose presence/absence represent binary 0's and 1's within a string. The message encoded is made of the actual message/data that needs to be Auto ID (such as a numeric or alphanumeric message string "A" (e.g. A2CFBD90T) represented in the form of bits "0" or "1"s, plus the bits required for the error correction scheme (usually Reed-Solomon or similar). The error correction is itself a separate string "B" (also of one or more-bit lengths), based on the ANSI/ISO specification for the symbology.

The 2-D barcode (again in one embodiment encoded in a Data Matrix symbol, although others may be used) has a finding patter/clock signal 202 that helps the image acquisition in determining the area 204 where each of the bits from the combined A+B string are located. The decoder then uses the matrix 204 to determine the value of each cell within the matrix.

In one embodiment, the individual characters in the Data Matrix code are encoded in 8-bit groups 302, called codewords. FIG. 3 illustrates the codewords placement 300 within a DMx symbol. Most codewords (save the edges, are laid out in the 'Utah' patters 2-3-3 302). Some code words will be spread along the symbol (Like the W of Wikipedia 304/306).

The message is comprised of the data codewords (each 8-bit cluster forming a codeword), in this case the characters W I K I P E D I A, plus the 8-bit character END, plus the error correction codewords E1-E12 (308), whose value in the case of the DMx symbology is determined by a Reed-Solomon error correction schema.

The reason for the error correction in 2-D codes is driven by the need to correct for normal wear and tear on the symbols, as well as for errors during scanning/imaging of the labels. During decoding, the value of a single cell may be mis-read 402, or all or portions of the symbol may have been lost to label/mark damage 404. In each case, the complete A+B (Data 302+Error Correction 308) string is established (with the mis-read bits), but the Reed-Solomon error correction is used to correct the mis-read (402 or 404) cells. When the number of cells mis-read exceeds the capability of the R-S error correction (ECC), the code becomes unreadable. However, in many applications, the amount of R-S ECC (the 'B' portion of the message), i.e. the percentage of ECC used because of label damage or cell misreading, is minimal.

In the applications where the above happens, it may be possible to use some of the built-in R-S ECC in the code, to create 'private' codes (i.e. printed with specific and intentional changes to the codeword color in the public 2D code specification). Such changes could then be used to determine that the code has been created by an original product manufacturer, rather than by a counterfeiter. In one embodiment, the product supplier decides that in their Vi3-like traceability unique ID codes 500, four locations within the 2D barcode will be alternated in color. These are location (2,3) 502, (3,4) 504, (5,8) 506 and (8,9) 508. So, the 'valid' code is not 500, but 600, with alternated location colors (2,3) 602, (3,4) 604, (5,8) 606 and (8,9) 608.

Of course, during 'normal' scanning, the code will read, the mistaken cells will be corrected through the R-S ECC, and the string 'A' will result as the scan. But in this case, the decoder (which processes the image of the code), would inform which codewords were corrected, both at the codeword level or at the individual cell (which of the 8 bits (602, 604, 606, 608) was alternated. Alternatively, the decoder software may be told by the decoder that the cells 502/504/506/508 were in error, thus double binding determining that the value is 'A', and the label has the secret code.

In another embodiment, the individual cells to be 'alternated' are not fixed, but a function of the string 'A', the combined string 'A+B' or variations thereof. So, the 'n' number of cells that are alternated and their location, are obtained by a function operation on the strings. In this case, similar to that used in assigning credit card numbers where not all sequential numbers are valid, someone may replicate a code, but not be able to generate new 'valid' enhanced codes without knowing the function being used. In this fashion, the decoder would provide a validation routine with the cells that were mis-colored, and the validating software would then be able to calculate (based on the 'A', 'A+B' or other string) which were supposed to be mis-colored, and then produce a validation signal.

The above allows another option for anti-counterfeiting is to place a "watermark" into the 2D barcode, which makes copying the tag more difficult for the counterfeiter. There are many types of watermarking that are described throughout literature. To successfully accomplish a watermarking system, you need to the following requirements:

1. It must be possible to print the watermark using the printers that are already in place and being used to print current labels
2. The watermark must measurably increase the difficulty for the counterfeiter to copy a tag
3. The watermark must not make it significantly more difficult to decode the 2D barcode with mainstream mobile applications
4. The watermark must be different for each and every identifier
5. Given an observed watermark and an identifier, it must be possible to apply an algorithm to determine with certainty if the watermark matches the identifier In one embodiment, the decoder may be tuned to magnify the one or more parts of the code that is/are supposed to have the chamfer and/or fillet, and automatically calculate their presence, and/or highlight their presence to the user. In another embodiment, the chamfer/fillet is detected not by the 'regular' scanner but by a higher resolution verifier/authenticator. As before, which one or more cell of the 2D code has the chamfer/fillet is determined by a function of the string 'A' or 'A+B', or it may be a fixed location (e.g. 502, etc.).

Both QR-Code and Data Matrix 2D barcodes use a number of Reed-Solomon codewords specifically for the purpose of correcting errors in the 2D barcode. In both symbologies, there is a substantial amount of error-correction that is possible via the Reed-Solomon codes. By intentionally corrupting a small percentage of the Reed-Solomon codes in a deterministic way, we introduce hidden data into the 2D barcode. Of course, the amount of RS corruption is small enough that the 2D barcode will still decode reliably and properly with all mainstream decoder applications.

In one embodiment, an important component of this technique would be that the actual RS errors are varied for every encoded unique identifier. In this way, the specific Reed-Solomon codewords that are altered (and exactly how they are altered), become a deterministic function of the original unique identifier.

Intentionally corrupting Reed-Solomon modules (as described above) creates a large enough change to the label that it is relatively easily to photograph. Because such watermark features are easily photographed, it can be defeated by sophisticated high-resolution photographic reproduction. In another embodiment, a different technique is used that creates features in a 2D barcode that are much more difficult to photograph. We term these "CF" watermarks, short for Chamfer & Fillet, because in this type of watermark, adds single-pixel chamfers and fillets to the 90-degree angles of the black and white modules within the 2D barcode. This type of watermark requires a highest level of integration with the label print company but is the most difficult for a counterfeiter to copy.

A chamfer or fillet is essentially a microfeature—it is a feature that is ideally exactly 1 printer pixel in size. Depending on the printer, it might be barely visible to the naked human eye, but probably requires a loupe or other magnification to analyze with any degree of certainty.

Figure 7:
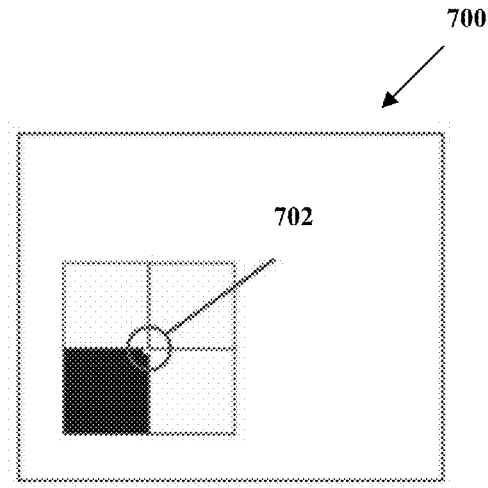
FIG. 7 shows a single pixel chamfer microfeature on a purposely modified 2-D Data Matrix code, according to an exemplary embodiment of the invention.

Chamfers 700 (FIG. 7) are introduced as follows: the external corner of a black module that is surrounded on 2 adjacent sides by 3 white modules, is eligible for optional chamfering, as shown in 702. The rotational orientation is irrelevant—the important thing is that there is a clean 90-degree angle on the corner of a black module.

Figure 8:
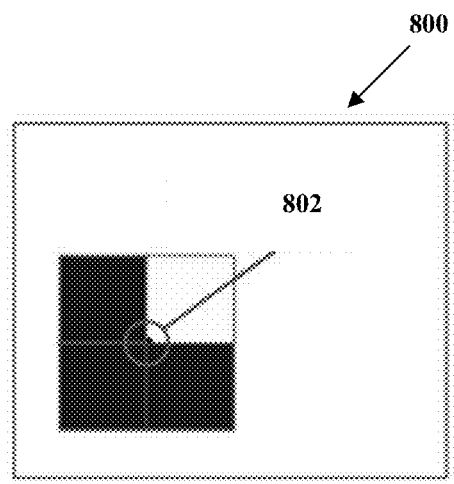
FIG. 8 shows a single pixel fillet microfeature on a purposely modified 2-D Data Matrix code, according to an exemplary embodiment of the invention.

Fillets 800 (FIG. 8) are introduced as follows: the internal corner created by 3 adjacent black modules (forming an "L") is eligible for an optional fillet 802. Again, the rotational orientation is irrelevant.

Figure 9:
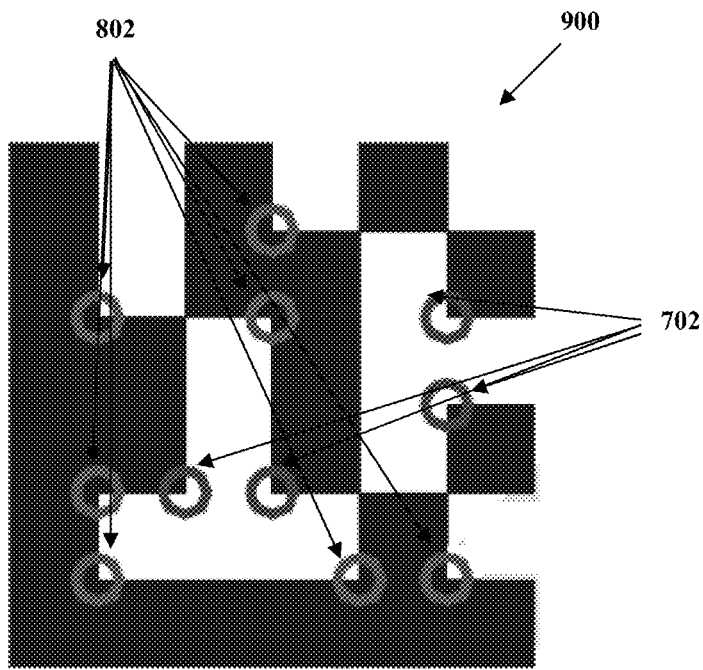
FIG. 9 shows highlighted eligible chambers and fillets on a purposely modified 2-D Data Matrix code, according to an exemplary embodiment of the invention.

FIG. 9 illustrates a hypothetical 6×6 Data Matrix 900 barcode, along with all possible eligible fillets and chamfers. Eligible locations for fillets 802 circled and eligible locations for chamfers 702 are also marked.

Note that chamfers 702 never occur around the external perimeter of the 2D barcode, and that that neither fillets 802 nor chamfers 702 appear at the intersection created by two diagonally adjacent black modules.

The fillets and chamfers have been described as "single pixel" features. This term is loosely used to describe the ideal size of the microfeature. For low-DPI black & white heat transfer printers, a good target would be to make the size of the fillet/chamfer literally 1 pixel in size. Note that the smallest feature that a printer can singly print, i.e. when we say 300 dpi, this is $1/300^{th}$ of an inch dot. However, for high-resolution color laser printers, a feature that is 1 pixel in size would be too small to reliably recognize, even with magnification, and therefore a suitable size will need to be chosen. The goal is to create the smallest feature that will print reliably and will therefore be the most difficult for a counterfeiter to photograph.

The locations for chamfers and fillets have been described as "eligible" locations. That is because not every location eligible for a microfeature will actually have the microfeature. In one embodiment, some eligible locations will have it, and some will not. Whether or not a particular location has the microfeature can be accomplished by securely and deterministically mapping the 2-D barcode unique identifier to a sequence of bits that specify whether each eligible location, in fact, has the microfeature. Therefore, the presence/absence of the fillets 802 and chamfers 702 varies for every unique identifier. Since the variation is deterministic, it is possible to examine a set of fillets 802 and chamfers 702 and to determine with certainty whether or not they are in the correct locations, thereby indicating with high probability that the label is authentic.

In the 6×6 sample barcode, there are 7 possible locations for fillets 802 and 4 possible locations for chamfers 702, for a total of 11 microfeatures that are either present or absent. If we use a single bit to represent a microfeature's presence or absence (e.g. 0=absent, 1=present), then this sample 6×6 barcode would have 11 bits of hidden data embedded in it. (A more realistic 20×20 Data Matrix barcode will have hundreds of possible locations for microfeatures). The value of the 11 bits can be computed from, for example, a securely salted hash of the 2D symbol's input string. In this way, the presence and absence of microfeatures is different for each and every different 2D symbol.

Upon decoding, the presence/absence of the specific fillet 802 or chamfer 702 in the appropriate location may be determined by automatic examination of the captured image for decoding, or of a higher resolution image specifically captured in the device, then post processed via well-known machine vision automatic routines.

A counterfeiter will not know how to compute the bits that dictate the presence/absence of microfeatures. Of course, he could photograph an authentic 2D barcode at high enough resolution to capture the microfeatures and re-print them. Alternatively, he could manually locate the microfeatures with the assistance of magnification and create corresponding label artwork to print the chamfers and fillets directly. Both of these options vastly increase the cost and difficulty for the counterfeiter to create labels that pass our authenticity testing on close examination.

The previous section described the theory behind how a serialized 2D barcode can be watermarked in a way that every watermark is different, and how the differences in watermarks can be securely computed. These schemes make it impossible for a counterfeiter to create accurate watermarks for an arbitrary serial number.

As far as specific implementation details for both types of watermarks, we can explore some exemplary embodiments. In the case of RS watermarks, we could use an exact algorithm for deciding which of the Reed-Solomon codewords are to be altered, and then an exact algorithm for deciding which modules to invert (black-to-white or white-to-black) within those selected codewords. In the case of CF watermarks, in one embodiment we could use exact algorithm for deciding which of the possible chamfer/fillet microfeature locations actually contain the microfeature.

There are two tasks for implementing the RS watermark: first to select which Reed-Solomon (RS) codewords will be altered, and secondly to select which bits of the 8-bit RS codewords will be inverted.

We must be careful not to alter too many RS codewords, otherwise it may become difficult for consumer decoders to actually decode the 2D barcode. The RS codewords are normally intended to correct damage to the physical label, wherein some of the barcode becomes unreadable. The more errors that we introduce with the watermark, the less tolerant the barcode will be of physical damage and other readability issues. If too many errors exist (both from physical label damage and the watermark), then the 2D barcode will be completely unreadable.

As an example, if you are using a 2D barcode that has 16 Reed-Solomon codewords, perhaps a realistic choice would be to alter no more than 4 of them. Larger 2D barcodes may be used, and since these will have even more Reed-Solomon codewords, they will therefore be proportionally less affected by a fixed number of altered RS codewords.

The next task is to select which of the RS codewords to alter. In order to do that, it is first necessary to assign an index to each of the RS codewords that appear in 2D barcodes—i.e. we will number the RS error codewords to identify them. QR code and Data matrix barcodes both have a natural ordering to the RS error codewords, and this can be used to assign an integer identifier to each codeword to identify it.

Once the RS error codewords are indexed (numbered from 0-[n−1]), we must generate 2 integers in that range, and the corresponding codewords will the ones to be altered in the watermark. It is important that every serial number produce a "random" set of 2 numbers. The term "random" is used loosely, because the 2 integers are not selected at random, because this would not allow us to verify the watermark when looking at the 2D barcode later. Instead these 2 integers are selected based on a secure hash of the string being encoded in the 2D barcode.

For example, suppose we are generating a batch (e.g. quantity=5) of 18×18 Data Matrix (20×20 with finder pattern), which contains 18 RS error codewords. We do not want to alter the same two RS error codewords for all 5 barcodes in the batch; nor do we want to pick them at random. Instead we securely hash the string that is encoded in each Data Matrix and use those hashes to deterministically generate 5 sets of two integers in the range 0-17 (recall the 18 RS error code words are numbered from 0-17).

Before we can deterministically generate two integers to select RS error codewords, we must first create a secure hash of the encoded string. The important thing about this hash is that it must be a trade secret. If counterfeiters were able to generate the secure hash, then they would be able to calculate which two RS error codewords should be altered, and the watermark would become predictable and therefore useless for brand protection.

Secure hashes are well-known and published throughout cryptographic literature. A good hash with no known weaknesses is the SHA-256 hash, which is documented in FIPS PUB 180-4. The SHA-256 hash accepts an arbitrary length data input, and outputs 32 bytes of hash data. In an alternate embodiment, any suitable cipher (such as AES) may be used instead of the salted hash.

Since hash algorithms and ciphers are well-documented, it would be easy for a counterfeiter to reproduce them. Therefore, we use a cryptographic technique called "salting", wherein an additional secret 16-byte "salt" is fed into the hash algorithm prior to feeding the input string. The same secret salt is used for hashing all 2D barcodes. This essentially creates a secret and secure one-way function that no one in the world can duplicate, unless they know the secret salt data.

SHA-256(SALT+ENCODED_STRING)=32_BYTE_DATA

For example:
Suppose the secret 16-byte salt is the following data (shown here in hex):
63 B4 03 AC 27 84 ED 79 64 C6 4D B0 99 23 75 6D
And suppose the data encoded in a 2D barcode is the following 20-character string:
VMDMX.COM/BCMFVJ37CHS8D2GMP9V
Feed the following 36 bytes (salt+encoded string) into the SHA-256 algorithm (shown here in hex):
63 B4 03 AC 27 84 ED 79 64 C6 4D B0 99 23 75 6D
56 4D 44 4D 58 2E 43 4F 4D 2F 42 43 4D 46 56 4A
33 37 43 48 53 38 44 32 47 4D 50 39 56
The resulting hash is the following 32 bytes (shown here in hex):
E8 20 8F 63 9A 4B AA B8 07 D3 A6 5D FD 50 CE 30
47 31 E2 7C 5E 98 2D 6E 63 1A C5 7A DD 66 28 3A
You then have 32 bytes of data that are essentially a unique "fingerprint" of a particular 2D barcode, and which cannot be generated by anyone in the public. You then use these 32 bytes as the basis for selecting integers to identify which RS error codewords will be altered in the watermark. The next step is to generate the integers that represent those RS error codewords.

Once you determine which RS codewords will be altered to create the watermark, then you must select which bits will be inverted. The value of all RS error codewords is an 8-bit number from 0 to 255. A question to answer is how many of the 8 bits should be inverted? To create the maximum number of available combinations, it is optimal to invert up to half of the bits (4). We can now go about selecting 4 of the 8 bits to invert, again drawing data from the "fingerprint" discussed previously.

If 4 bits are inverted in each of four RS codewords, that means a total of 16 cells/modules in the 2D barcode will have their white/black colors inverted. A typical 18×18 (20×20 with finder pattern) Data Matrix has 324 cells/modules (excluding finder pattern). Inverting 16 out of the 324 cells/modules means that about 4% of the 2D barcode has been altered, which should be unnoticeable by a human casually observing the symbol.

It is now possible to compute how many combinations of watermarks there are for a particular symbology. For example, given an 18×18 (20×20 with finder pattern) Data Matrix, how many possible watermarks can be made on that symbology? This result will give us an idea of how difficult it would be for a counterfeiter to guess the correct watermark (since he cannot compute the correct watermark unless he knows the "salt" to calculate the secure hash). In the simplest possible 2D barcode, there are over ½ million possible watermarks, and larger barcodes will have even more combinations (having a higher value of "d"). Therefore, a counterfeiter is extremely unlikely to guess the correct watermark

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claim's hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A computer implemented method for intentionally creating uniquely modified 2D barcodes that differ from standard 2D barcodes, performed by one or more processors, the computer implemented method comprising:
    starting with a data string to encode, the one or more processor generating the data codewords and error correction codewords for said data string, using industry-standard 2D barcode generation schemes;
    modifying by the one or more processors, one or more bits within one or more said codewords while not exceeding the error correction limitations so as to generate a set of modified codewords that are still a decodable 2D symbol; and
    generating by the one or more processors, a 2D symbol based on said modified codewords using industry-standard 2D barcode methods.

2. The computer implemented method of claim 1 wherein;
    said modifications to codeword bits are based on the original data string, wherein the original data string is computationally transformed by the one or more processors into a selection of codeword bits to modify, such that the final 2D symbol constructed from the modified codewords can still be successfully scanned by industry-standard 2D scanners.

3. The computer-implemented method of claim 2 wherein;
    said data string transformation is based on a hash by the one or more processors of the original data string in which the hash is first salted with a secret salt to prevent counterfeiters or others in the public from accurately computing which codeword bits to modify.

4. The computer-implemented method of claim 1 wherein;
    scanning said 2D barcode by one or more computer processors;
    receiving by the one or more processors from said 2D barcode decoder a list of the bits and/or codewords in error that result from the codeword modifications, comparing said errors to the expected errors that were computed as described in claims; and
    if an appropriate number of errors match, then one or more processors declaring said barcode authentic.

5. A computerized system for intentionally creating uniquely modified 2D barcodes, said computerized system comprising:
    one or more computing servers for generating the data codewords and error correction codewords string for a particular 2D symbol, according to industry-standard 2D barcode generation schemes;
    said computer servers modifying one or more bits within one or more said codewords while not exceeding the error correction limitations so as to generate a modified codewords string that is still a decodable 2D symbol; and
    said computer servers generating a 2D symbol based on said modified codewords using industry-standard 2D barcode methods.

6. The system of claim 5 wherein;
    scanning said 2D barcode;
    receiving from said 2D barcode decoder a list of the bits and/or codewords in error that result from the codeword modifications, comparing said errors to the expected errors that were computed as described in claims; and
    if an appropriate number of errors match, then declaring said barcode authentic.

7. A 2D barcode authenticated indicia comprising;
    modifying one or more of its data modules/cells by the addition of a microfeature that is either a chamfer or a fillet within said indicia module/cell.

8. The 2D barcode of claim 7 wherein;
    the presence and absence of said chamfer/fillet microfeatures is based on the original data string, wherein the original data string is computationally transformed into a sequence of bits that dictate the presence/absence of the microfeature in eligible modules/cells.

9. The 2D barcode of claim 8 wherein;
    said data string transformation is based on a hash of the original data string in which the hash is first salted with a secret salt to prevent counterfeiters or others in the public from accurately computing which modules/cells eligible for a microfeature will actually have the microfeature.

10. The 2D barcode of claim 7 wherein;
    scanning said 2D barcode;
    a digital screen presenting a diagram to an authorized user that shows the expected locations for said fillet/chamfer microfeatures for that particular 2D barcode;
    an authorized user checking to ensure that the microfeatures shown in said diagram actually exist in the physical barcode, and the microfeatures not shown in said diagram do not actually exist in the physical barcode; and
    if an appropriate number of microfeatures match, then declaring said barcode authentic.

* * * * *